United States Patent
Fox

(10) Patent No.: US 10,623,085 B2
(45) Date of Patent: Apr. 14, 2020

(54) RELAY

(71) Applicant: Cubic Corporation, San Diego, CA (US)

(72) Inventor: Andrew John Fox, Chippenham (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/095,615

(22) PCT Filed: May 4, 2017

(86) PCT No.: PCT/GB2017/051240
§ 371 (c)(1),
(2) Date: Oct. 22, 2018

(87) PCT Pub. No.: WO2017/191452
PCT Pub. Date: Nov. 9, 2017

(65) Prior Publication Data
US 2019/0140735 A1   May 9, 2019

(30) Foreign Application Priority Data
May 6, 2016   (GB) .................................. 1607954.3

(51) Int. Cl.
*H04L 5/12* (2006.01)
*H04B 7/155* (2006.01)
(Continued)

(52) U.S. Cl.
CPC ......... *H04B 7/15571* (2013.01); *H04B 7/043* (2013.01); *H04B 7/0695* (2013.01);
(Continued)

(58) Field of Classification Search
CPC .. H04B 7/15571; H04B 17/318; H04B 7/043; H04B 7/0695; H04B 7/15507; H04W 40/12; H04W 48/20
(Continued)

(56) References Cited

U.S. PATENT DOCUMENTS 9,749,880 B2 * 8/2017 Bao ........................ H04W 24/04
2014/0073337 A1 * 3/2014 Hong ...................... H04W 16/28
455/452.1
(Continued)

FOREIGN PATENT DOCUMENTS

EP    2335432 B1    6/2011
EP    2934043 A1    10/2015
WO   20140142361 A1  9/2013

OTHER PUBLICATIONS

International Search Report and Written Opinion, prepared by the European Patent Office as International Searching Authority, dated Nov. 27, 2017, for PCT International Patent Application No. PCT/GB2017/051240, 16 pages.

*Primary Examiner* — Helene E Tayong
(74) *Attorney, Agent, or Firm* — Kilpatrick Townsend & Stockton

(57) ABSTRACT

A device is operated in a cellular communications network, such that the device acts as a relay in a backhaul link between at least one first base station and the network. The device is configured to: detect signals transmitted by base stations in the network; identify the at least one first base station amongst the base stations; exclude the identified at least one first base station, and select one of the base stations based on the properties of the detected signals; and establish a connection with the selected base station.

22 Claims, 5 Drawing Sheets

(51) Int. Cl.
*H04B 17/318* (2015.01)
*H04B 7/0426* (2017.01)
*H04B 7/06* (2006.01)
*H04W 40/12* (2009.01)
*H04W 48/20* (2009.01)

(52) U.S. Cl.
CPC ....... *H04B 7/15507* (2013.01); *H04B 17/318* (2015.01); *H04W 40/12* (2013.01); *H04W 48/20* (2013.01)

(58) Field of Classification Search
USPC ......................................................... 375/262
See application file for complete search history.

(56) References Cited

U.S. PATENT DOCUMENTS

| | | | |
|---|---|---|---|
| 2014/0099881 A1 | 4/2014 | Boudreau | |
| 2014/0162655 A1* | 6/2014 | Hong | H01Q 21/061 455/436 |
| 2014/0185497 A1* | 7/2014 | Wolf | H04W 28/26 370/294 |
| 2014/0204832 A1 | 7/2014 | Van Phan | |
| 2014/0307664 A1* | 10/2014 | Chen | H04B 7/0456 370/329 |
| 2016/0277938 A1* | 9/2016 | Hasegawa | H04W 16/14 |
| 2017/0034799 A1* | 2/2017 | Kim | H04W 56/00 |

\* cited by examiner

RELAY

CROSS-REFERENCE TO RELATED APPLICATIONS

This application is a U.S. national phase under 35 U.S.C. of § 371 PCT International Application Number PCT/GB2017/051240, filed on May 4, 2017, which claims the benefit of priority to Great Britain Patent Application No. 1607954.3, filed on May 6, 2016. Each of these applications is hereby incorporated by reference in its entirety for all purposes.

This relates to a relay, and in particular to a device that can act as a relay to provide a backhaul link from one or more cells of a cellular network to another base station, either in the same network or a separate network.

In some situations, small cells are deployed in order to provide additional cellular network capacity in specific local areas. When a small cell is deployed, it is necessary to provide a backhaul connection from the small cell into the cellular network.

One proposal is to use a device with User Equipment (UE) functionality to establish a connection with another cell of the cellular network, and then to use that UE device to act as a relay to provide a backhaul link between the small cell and the cellular network. The UE device could also be used as a backhaul link between and size base station and a cellular network.

According to a first aspect of the present invention, there is provided a method of operation of a device in a cellular communications network, such that the device acts as a relay in a backhaul link between at least one first base station and the network, the method comprising:

detecting signals transmitted by base stations in the network;
  identifying the at least one first base station amongst the base stations;
  excluding the identified at least one first base station, and selecting one of the base stations based on the properties of the detected signals; and
  establishing a connection with the selected base station.

According to a second aspect of the present invention, there is provided a method of operation of a device in a cellular communications network, such that the device acts as a relay in a backhaul link between a first base station and the network, the method comprising:

causing the first base station to interrupt its transmissions;
  detecting signals transmitted by base stations in the network during the interruption of transmissions from the first base station;
  selecting one of the base stations based on the properties of the detected signals; and
  establishing a connection with the selected base station.

According to a third aspect of the present invention, there is provided a method of operation of a control device, the method comprising:

detecting transmissions from one or more base station, and determining transmit time intervals thereof;
  initiating suppression of transmit signals from the one or more base station during at least one subsequent transmit interval; and
  detecting signals transmitted by at least one other base station during said subsequent transmit interval.

According to other aspects of the invention, there are provided devices configured to operate in accordance with the first, second and third aspects, and devices that contain processors and memories, wherein the memories contain program instructions for causing the device to operate in accordance with the first, second and third aspects.

This has the advantage that the device can be deployed as a relay without requiring any network management. This has particular advantages in the case of a device to be used for providing backhaul for a base station that is deployed on a nomadic or moving platform, in which case the network environment may be continually changing.

For a better understanding of the present invention, and to show how it may be put into effect, reference will now be made, by way of example, to the accompanying drawings, in which.

DETAILED DESCRIPTION

Figure 1:
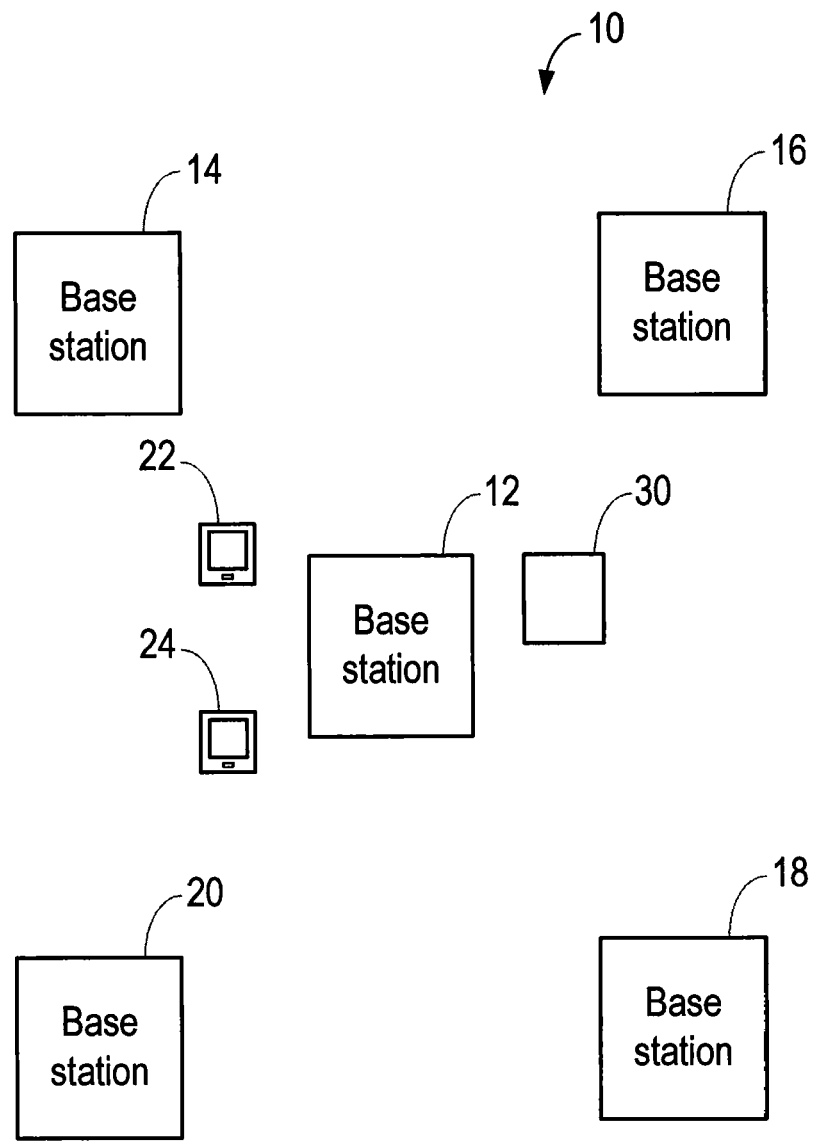
FIG. 1 shows a part of a cellular network in one embodiment.

FIG. 1 shows a part of a cellular communications network 10. The network may use any suitable cellular technology or mixture of technologies, such as GSM, GPRS, 3G, 4G/LTE, 5G, or the like.

The network 10 includes multiple base stations. In this description, the base station 12 will be described as the "first" base station, and the base stations 14, 16, 18, 20 are base stations that surround the first base station 12. The number of surrounding base stations, and their locations, will depend on where the first base station is deployed.

In one possible deployment scenario, the first base station 12 is a base station (for example a small cell base station), that has been deployed in order to provide additional network capacity in a particular locality, or in order to extend the reach of the network 10 into a particular area.

In another possible deployment scenario, the first base station 12 is a small cell base station, that has been deployed on a mobile platform, such as a train carriage, a bus, or a boat, in order to provide network capacity for passengers on that platform, while the mobile platform is moving through an environment that contains the base stations 14, 16, 18, 20 and may also contain a large number of other base stations.

In general, the first base station 12 may be a small cell base station, or may be any other type of base station.

Some or all of the surrounding base stations 14, 16, 18, 20 may be macrocell base stations. Alternatively, or additionally, some or all of the surrounding base stations 14, 16, 18, 20 may be small cell base stations.

FIG. 1 also shows two UE devices 22, 24, which are connected to the first base station 12, in order to receive cellular service through the first base station 12. It will be appreciated that there may be any number of such UE devices. In a deployment scenario in which the first base station 12 is extending the reach of the cellular network into a particular area, the UE devices 22, 24 may be in positions in which they would find it difficult to connect to one of the base stations 14, 16, 18, 20. In a deployment scenario in which the first base station 12 is deployed on a mobile platform, the UE devices 22, 24 may also be on that same platform. For example, if the first base station 12 is deployed in a train carriage, the UE devices 22, 24 may be in use by passengers in that carriage.

In order to work within the cellular network 10, the first base station 12 must have a backhaul connection to the core network of the cellular network. Where one or more of the base stations 14, 16, 18, 20 is a macro cell base station, it will be provided with a fixed backhaul link into the core network of the cellular network. Where one or more of the base stations 14, 16, 18, 20 is a small cell base station in a fixed location, it will typically also be provided with a backhaul link, for example over an internet connection, into the core network of the cellular network.

In the embodiment shown in FIG. 1, the backhaul link is provided via a device 30 having User Equipment device functionality, which acts as a relay between the first base station 12 and one of the other base stations 14, 16, 18, 20, and provides a backhaul link through that one of the other base stations.

In some embodiments, the device 30 may conveniently be co-located with the first base station 12. In other embodiments, the device 30 may be located separately from the first base station 12. For example, if the first base station 12 is deployed to extend the reach of the network 10 into a particular area, perhaps because there is a region from which a UE device would be unable to connect to any base station of the cellular network, then the device 30 would need to be positioned at a location at which it could establish connections with the first base station 12 and with one of the other base stations 14, 16, 18, 20.

Figure 2:
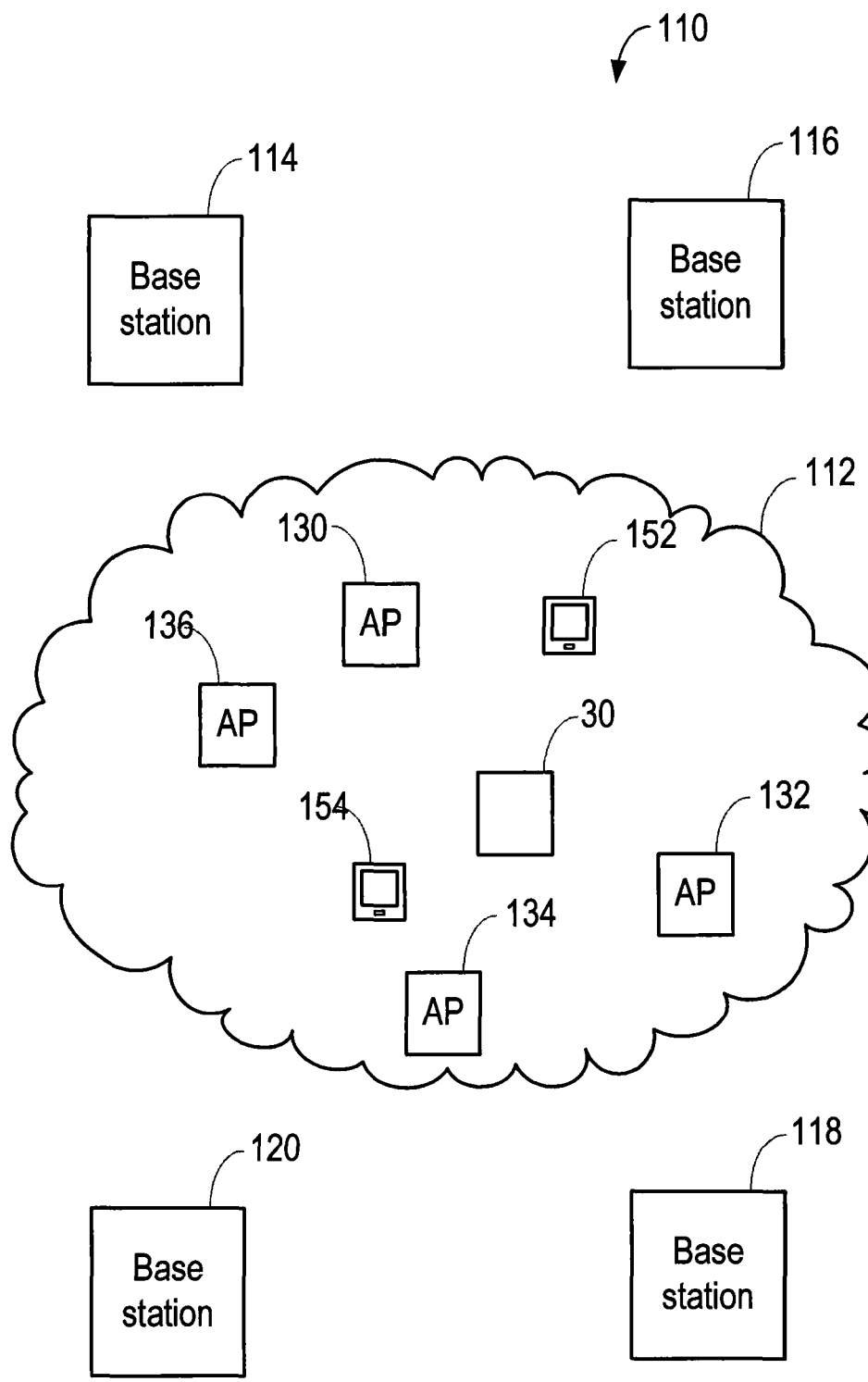
FIG. 2 shows a part of a cellular network in another embodiment.

FIG. 2 shows a part of another cellular communications network 110. The network 110 may use any suitable cellular technology or mixture of technologies, such as GSM, GPRS, 3G, 4G/LTE, 5G, or the like.

The network 110 includes multiple base stations 114, 116, 118, 120 in the vicinity of a local area 112. The number of such base stations, and their locations, will depend on the situation of the local area. Some or all of the base stations 114, 116, 118, 120 may be macrocell base stations. Alternatively, or additionally, some or all of the base stations 114, 116, 118, 120 may be small cell base stations. In some embodiments, the base stations 114, 116, 118, 120 a part of a cellular network, and have backhaul connections to the core network of that cellular network. Where one or more of the base stations 114, 116, 118, 120 is a macro cell base station, it will be provided with a fixed backhaul link into the core network of the cellular network. Where one or more of the base stations 114, 116, 118, 120 is a small cell base station in a fixed location, it will also be provided with a backhaul link, for example over an internet connection, into the core network of the cellular network.

As shown in FIG. 2 the local area 112 contains a separate wireless communications network, that includes access points (AP) 130, 132, 134, 136. These access points 130, 132, 134, 136 may be small cell base stations, Wireless Local Area Network (WLAN) access points, or a mixture thereof, or any similar device. The access points 130, 132, 134, 136 may be provided at fixed locations, for example in a small community. As another example, the access points 130, 132, 134, 136 may be provided on vehicles, in which case the vehicles may be able to move throughout the coverage area of the network 110, such that they define the area 112 depending on their current locations.

FIG. 2 also shows two UE devices 152, 154, which may connect to any one of the access points 130, 132, 134, 136, in order to receive wireless service through the relevant access point. It will be appreciated that there may be any number of such UE devices.

In some embodiments, the access points 130, 132, 134, 136 form a private network, which can only be accessed by registered users. For example, the access points 130, 132, 134, 136 may be deployed on vehicles belonging to particular organisation, and only UEs registered with that organisation may then access the private network.

The access points 130, 132, 134, 136 may be interconnected by WiFi or Long Term Evolution (LTE) links, as examples. In addition, the UE devices 152, 154 may have WiFi, 4G/LTE, 5G, or any other suitable connections to the relevant one of the access points 130, 132, 134, 136.

In order to provide a connection with the network 110, the access points 130, 132, 134, 136 are provided with a backhaul link provided via a device 30. As discussed with reference to FIG. 1, the device 30 has User Equipment device functionality within the network 110, allowing it to act as a relay or mesh link between any one of the access points 130, 132, 134, 136 and one of the base stations 114, 116, 118, 120.

In some embodiments, the device 30 may conveniently be co-located with one of the access points 130, 132, 134, 136. In other embodiments, the device 30 may be located separately from the access points. The device 30 could conveniently be positioned at a location at which it could establish connections with any one of the access points 130, 132, 134, 136.

Using the device 30 as a relay then allows UEs, that have a connection to the network made up of the access points 130, 132, 134, 136, to connect to the cellular network 110, and thus to any other networked device.

Figure 3:
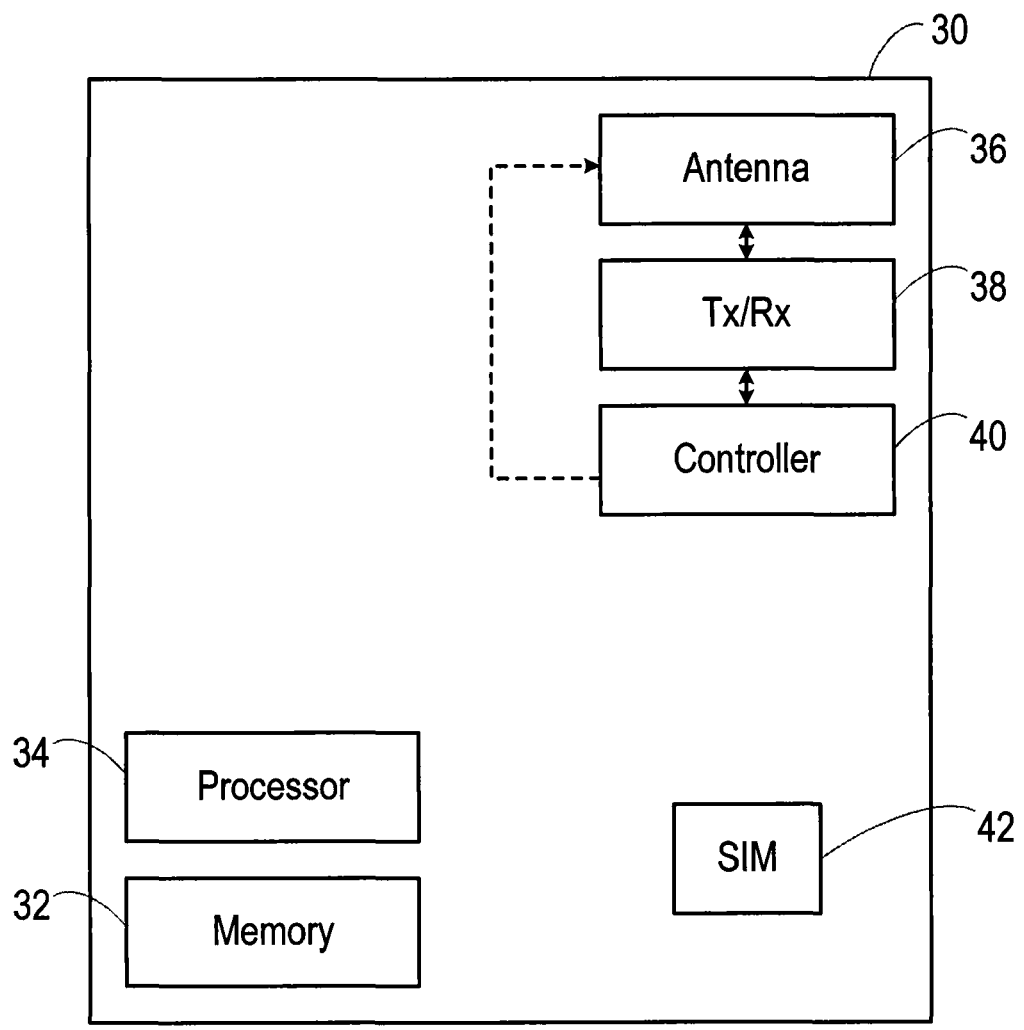
FIG. 3 shows a form of a UE device in one embodiment.

FIG. 3 is a block diagram, illustrating the form of the device 30, as shown in FIGS. 1 and 2, in one embodiment.

Specifically, the device 30 has a memory 32, for storing data and program instructions, and a processor 34 for performing the methods described herein on the basis of the stored program instructions.

Other modules shown in FIG. 2 can be implemented as hardware modules, or as software modules, or as combinations of hardware and software modules.

As discussed in more detail below, the device has some of the functionality of a conventional user equipment (UE) device, such as a UE modem. A suitably programmed UE device, such as a smart phone or tablet computer, can be used as the device 30, for example.

The device 30 has an antenna or antenna system 36, which may contain one or more antenna elements, and may be controllable so that the directionality of the antenna changes. Thus, the antenna 36 may incorporate one or more directional antennas that can be used selectively, and/or may have the ability to beam-form any required beam shape.

The device 30 also has transmit/receive circuitry 38, based on a UE modem.

The device 30 also includes a controller 40, for controlling the operation of the device 30. The controller 40 allows the device 30 to act as a relay, when it has established links with two separate devices, such as the first base station 12 and a selected other one of the base stations 14, 16, 18, 20.

The device 30 may also be provided with a SIM card 42, allowing it to authenticate itself to the cellular network.

Figure 4:
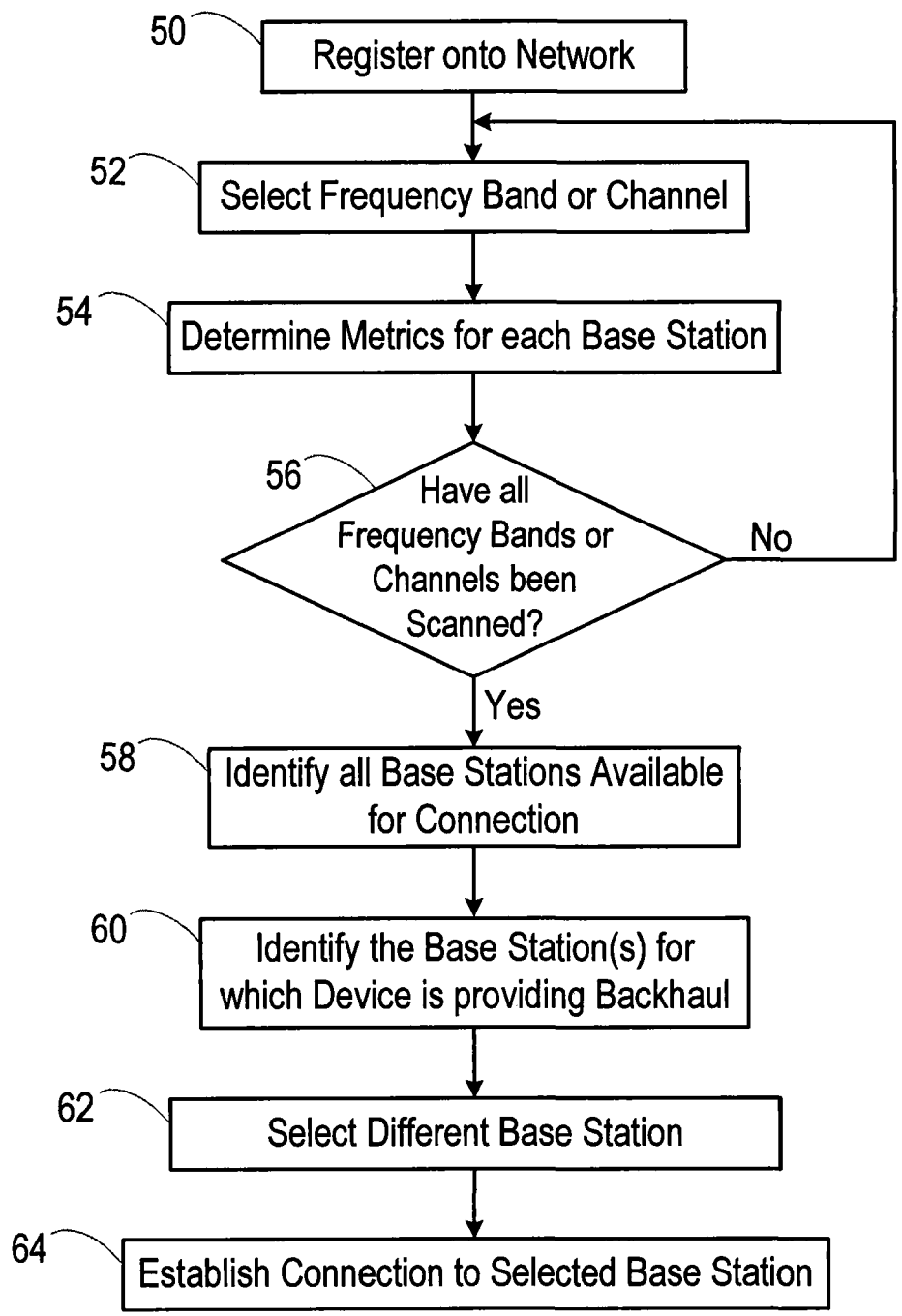
FIG. 4 is a flow chart, illustrating a first method.

FIG. 4 is a flow chart, illustrating a method performed by the device 30 in order to establish a connection with one of the surrounding base stations for carrying backhaul traffic between the first base station and the core network of the cellular network.

In step 50, the device 30 registers onto the network 10 or 110 (for example using a SIM card). During this time, information about the network is obtained including frequency or channel(s) of operation.

In step 52, the device 30 locks its frequency to the first available band or channel that is supported by the deployed network.

In step 54, the device 30 detects signals from as many surrounding base stations as possible, that are using that frequency band or channel. The device 30 then determines signal and connection metrics for each base station surrounding the UE that is within connection range of the UE. For example, if the device 30 has a steerable antenna, it may steer its antenna beam direction through 360 degrees or may generate antenna beam patterns covering 360 degrees in order to be able to detect the signals transmitted from the surrounding base stations.

In step 56, the device 30 determines whether all of the available frequency bands or channels have been scanned. If they have not, the process returns to step 52, in which a different frequency band or channel is selected.

When all of the available frequency bands or channels have been scanned, the process passes to step 58, in which the device 30 is able to identify a complete list of the base stations to which the device 30 could establish a connection. For example, the device 30 could create a table that contains all relevant information about all the base stations surrounding the device 30, for example including which antenna beam pattern or antenna beam direction corresponds to which specific base station identification or cell id.

In some cases, as described with reference to FIG. 1, the device 30 will be co-located with the first base station 12. Whether the device 30 is co-located with the first base station 12, or is located separately, it is crucial that the device 30 should establish a connection with a different base station for the purposes of carrying backhaul traffic to and from the base station 12.

Similarly, as described with reference to FIG. 2, the device 30 will be co-located with one of the access points 130, 132, 134, 136. Whether the device 30 is co-located with one of the access points 130, 132, 134, 136, or is located separately, it is crucial that the device 30 should establish a connection with a different base station for the purposes of carrying backhaul traffic to and from the base station 12.

Thus, in step 60, the device 30 identifies the one or more base station or access point for which it is providing a backhaul connection.

For example, in the case of the deployment shown in FIG. 1, it is necessary for the device 30 to identify the first base station 12, in order to ensure that the device 30 does not attempt to establish a further connection thereto for the purposes of sending backhaul traffic.

In such a deployment, one possibility is for the device 30 to assume that it will receive signals transmitted from the first base station 12 with a higher signal strength than signals transmitted from any other base station in the table created in step 58. Based on this assumption, the device 30 can therefore determine the frequency and band used by the first base station 12 for transmitting and receiving signals. This means that the device 30 can be programmed in such a way that it will not operate on the frequency of the first base station 12, but is allowed to operate on any other frequency.

In the case of the deployment shown in FIG. 2, it is necessary for the device 30 to identify all of the access points 130, 132, 134, 136, in order to ensure that the device 30 does not attempt to establish a further connection to any of those access points for the purposes of sending backhaul traffic.

In such a deployment, one possibility is for the device 30 to assume that it will receive signals transmitted from the access points 130, 132, 134, 136 with higher signal strengths than signals transmitted from other base stations in the table created in step 58. For example, the device 30 may assume that signals that it receives with signal strengths that are higher than a threshold were transmitted from the access points 130, 132, 134, 136. The threshold signal strength value may be predetermined, or may be set based on the received signal strengths.

Based on this assumption, the device 30 can therefore determine the one or more frequency and band used by the access points 130, 132, 134, 136 for transmitting and receiving signals.

There are other ways in which the device 30 can identify in step 60 the one or more base station or access point for which it is providing a backhaul connection.

As one example, this could be achieved by detecting the link delay between signals being transmitted by the nearby base stations or access points and being received by the device 30. The link delay is indicative of the distance between the transmitting base station or access point and the device 30. The device 30 can determine that any base station or access point having a link delay that is less than a threshold value is a base station or access point for which it is providing a backhaul connection.

As another example, this could be achieved by monitoring the downlink power information contained in the signals transmitted from the base stations. (For example, in LTE, downlink Random Access Channel (RACH) configuration transmissions contain a System Information Block that indicates the initial transmit power.) The device 30 can determine that any base station or access point having a transmit power that is less than a threshold value is very close to it, and can therefore assume that it is a base station or access point for which it is providing a backhaul connection.

As a further example, the device 30 may be able to obtain information relating to the location of base stations or access points, and may be provided with a Global Navigation Satellite System (GNSS) such as a Global Positioning System (GPS) location system for determining its own location. In that case, the device 30 may be able to determine that any base station or access point that is within a predetermined distance from it is a base station or access point for which it is providing a backhaul connection.

Having identified the one or more base station or access point for which the device 30 is providing a backhaul connection in step 60, the process passes to step 62.

In step 62, the device 30 selects a different one of the base stations identified in step 58, that is, one of the base stations identified in step 58 but excluding the one or more base station or access point identified in step 60. For example, the device 30 can select a base station based on the detected signal strength, based on a measure of signal quality, or based on an available data rate, using the information obtained in the scans of step 54.

For example, in the case of a situation such as that shown in FIG. 2, the identification performed at step 58 could detect a range of nearby cells (such as the cells 130, 132, 134, 136) that all have a signal strength that indicates their close proximity to the relay device 30, whereas the intention is to establish a connection to connect that local network to the outside world. Thus, in that case, all the nearby small cells might give a signal strength of greater than −80 dBm. However, the scan might also detect one eNodeB with a signal strength of −95 dBm. The device 30 might be providing a backhaul connection for some or all of the nearby small cells, while the eNodeB with the lower signal strength would be the one that should be used for the wide area connection. In that case, the selection threshold for the signal strength could be set to −90 dbm, allowing the eNodeB with a signal strength of −95 dBm to be selected in step 62.

In step 64, the device establishes a connection to the selected base station. For example, in the case of a cellular network, the device can perform an authentication process using the SIM card 42, in a similar manner to any UE device authenticating to a network. In other networks operating according to different standards, authentication may be performed as required by those standards. If the device 30 has a controllable directional antenna, and is aware of the direction in which the selected base station is located, then the antenna can be controlled so that it points toward that selected base station.

When the device 30 has established a connection to the selected base station, it can then act as a UE relay in a conventional manner, to allow the first base station 12 to establish a connection to that selected base station. Thus, traffic to and from UE devices such as the devices 22, 24 can use the connection between the first base station 12 and the selected base station through the relay device 30 as a backhaul link.

The process shown in FIG. 4 can be performed periodically, in order to discover the status of a dynamic radio environment. For example, the process may be performed once per minute. In some embodiments, the device 30 is provided with a movement sensor, and performs the process shown in FIG. 4 during periods when movement of the device 30 has been detected.

Once the base station has been selected in step 62 of FIG. 4, the link that is set up in step 64 will remain static until for some reason it fails. When this occurs, a link recovery mechanism can be used or, as in the case in LTE, the device 30 may be moved to a less contended base station. If the device 30 has an omnidirectional antenna, this would cause no problem. However, where the device 30 uses directional beams, a message or indication would need to be sent to the device 30, informing it about the new target base station, for example the ID of that base station.

For example, where base stations such as the base stations 14, 16, 18, 20 are LTE base stations, connected by an X2 interface, a serving base station may communicate with another base station, for example to share congestion information, and to arrange a handover to that other base station, for example for the purposes of load balancing. The serving base station can then send a message to the device 30, instructing it to direct its antenna to that other base station so that the handover can be performed.

From the information that it has previously gathered on its surrounding cells in the iterations of step 54, the device 30 will know the channel and beam direction of the new target cell, and will be able to set its frequency and beam direction to allow handover to the new cell. This will allow improved cell loading to be achieved.

In one embodiment, for example for use when the first base station is deployed on a mobile platform such as a vehicle, multiple devices 30 could be provided, and configured so that they operate in tandem.

In this configuration, while one of the devices 30 is attached to a surrounding base station, so that it can act as a relay in order to provide the backhaul link for the first base station, the other device could be performing some or all of the process shown in FIG. 4, and scanning for a better base station with which to form a link and backhaul the data from the first base station. This is particularly useful because, in the case of a first base station that is located on a mobile platform, the relevant radio environment will be continually changing, and so it is useful to be updating the list of available base stations, and the selection of the base station that is to be used for the backhaul link. In this situation, it may be advantageous for the device or devices 30 to be provided with omnidirectional antennas, so that an omnidirectional beam can be formed, at least when the platform is in motion.

Figure 5:
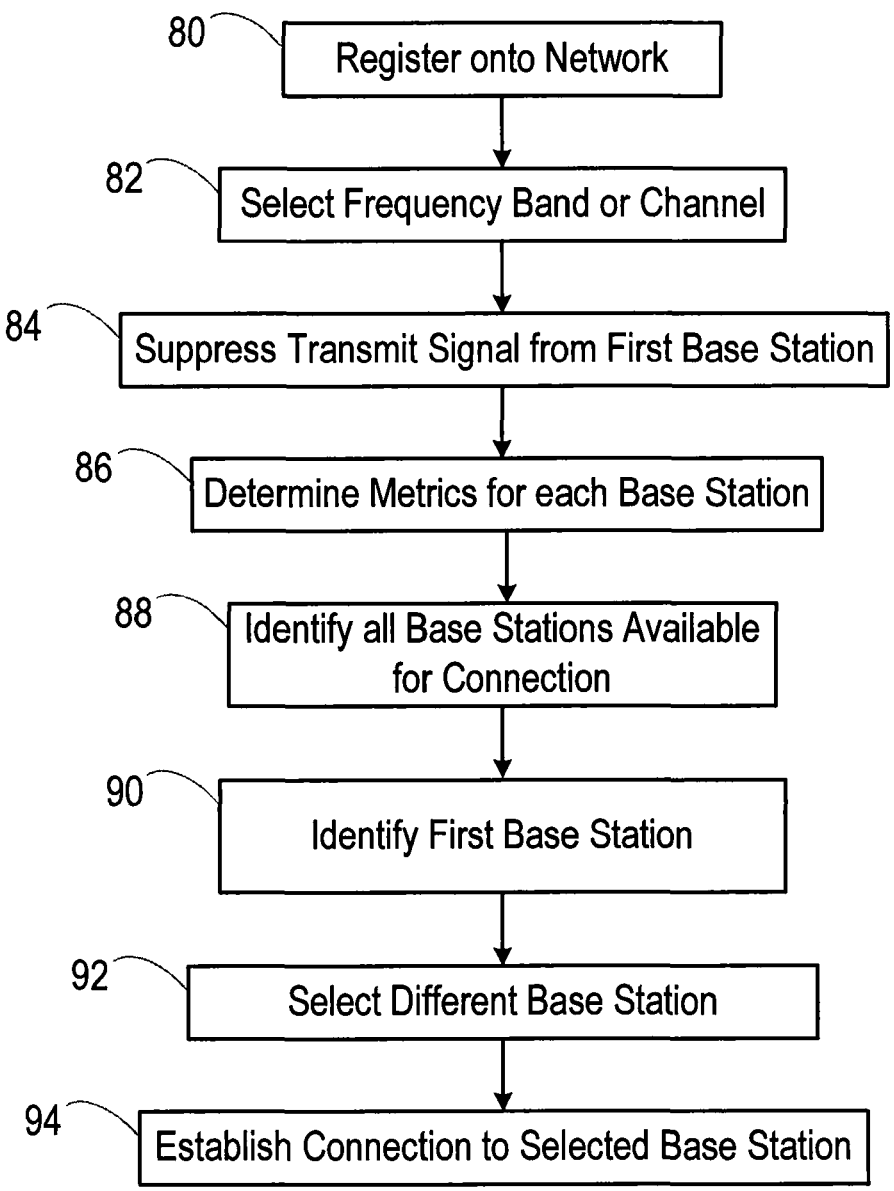
FIG. 5 is a flow chart, illustrating a second method.

FIG. 5 is a flow chart, illustrating an alternative method performed by the device 30 in order to establish a connection with one of the surrounding base stations for carrying backhaul traffic between the first base station and the core network of the cellular network.

The method shown in FIG. 5 is particularly useful in cases where all of the surrounding base stations are operating on the same frequency or channel and, especially, where they are operating in Time Division Duplex (TDD) mode. In this case, for example in a situation as illustrated in FIG. 1, the device 30 may be unable to detect signals transmitted by the base stations 14, 16, 18, 20 because those base stations will be transmitting at the same time as the first base station 12, and the signals transmitted by the base station 12 will be received by the device 30 with much greater signal strength than the signals transmitted by the base stations 14, 16, 18, 20.

In step 80, the device 30 registers onto the network 10 (for example using a SIM card). During this time, information about the network is obtained including frequency or channel(s) of operation.

In step 82, the device 30 locks its frequency to the frequency band or channel that is in use in the network.

In step 84, the transmit signal from the first base station 12 is suppressed. Specifically, this method is intended for use when the device 30 knows the CellId of the first base station 12, for example because the first base station 12 and the device 30 are co-located and have a predefined association. The device 30 can then send a command to the first base station 12, causing the transmit signal from the first base station 12 to be suppressed in the radio hardware or by an externally controlled attenuator between the power amplifier output and the antenna. In a deployment as shown in FIG. 2, the device 30 may take steps to suppress the transmissions from multiple access points, such as the access points 130, 132, 134, 136, so that it can detect signals transmitted during the relevant downlink transmit time divisions by the base stations 114, 116, 118, 120.

This suppression is synchronised to the transmit/receive time or frequency divisions of the network, so that the device 30 can detect signals transmitted by the nearby base stations, such as the base stations 14, 16, 18, 20 in a situation as shown in FIG. 1.

In step 86, the device 30 detects signals from as many surrounding base stations as possible, that are using that frequency band or channel. The device 30 then determines signal and connection metrics for each base station surrounding the UE that is within connection range of the UE. For example, if the device 30 has a steerable antenna, it may steer its antenna beam direction through 360 degrees or may generate antenna beam patterns covering 360 degrees in order to be able to detect the signals transmitted from the surrounding base stations.

Thus, the suppression of the transmit signal from the first base station, in step 84, must reduce the transmit signal to a sufficient level as to allow the device 30 to measure signal metrics (including the direction from which the signal is received) from other base stations as they come into range.

Ideally, this scan is performed within one transmit interval, which means that the suppression of the transmit signal would be short enough not to cause any connections made by other UE's to drop.

In step 88, the device 30 is able to identify a complete list of the base stations to which the device 30 could establish a connection. For example, the device 30 could create a table that contains all relevant information about all the base stations surrounding the device 30.

Thus, in step 90, the device 30 identifies the first base station 12. For example, it can be assumed that the first base station 12 will have the highest signal strength of any base station in the table created in step 88. The device 30 can therefore determine the frequency and band of the first base station 12. This means that the device 30 can be programmed in such a way that it cannot operate on the frequency of the first basestation 12.

In step 92, the device 30 selects one of the base stations identified in step 88. For example, the device 30 can select a base station based on the detected signal strength, based on a measure of signal quality, or based on an available data rate, using the information obtained in the scan of step 86.

In the case of a deployment as shown in FIG. 2, the identification performed at step 88 could detect all of the nearby cells (such as the cells 130, 132, 134, 136) that all have a signal strength that indicates their close proximity to the relay device 30, whereas the intention is to establish a connection to connect that local network to the outside world. Thus, in that case, all the nearby small cells might give a signal strength of greater than −80 dBm. However, the scan might also detect one eNodeB with a signal strength of −95 dBm. The device 30 might be providing a backhaul connection for some or all of the nearby small cells, while the eNodeB with the lower signal strength would be the one that should be used for the wide area connection. In that case, the selection threshold for the signal strength could be set to −90 dbm, such that all of these nearby cells are detected in step 90, and allowing the eNodeB with a signal strength of −95 dBm to be selected in step 92.

In step 94, the device establishes a connection to the selected base station. If the device 30 has a controllable directional antenna, and is aware of the direction in which the selected base station is located, then the antenna can be controlled so that it points toward that selected base station. The connection can then be established in a conventional manner.

Again, where base stations such as the base stations 114, 116, 118, 120 are LTE base stations, connected by an X2 interface, a serving base station may communicate with another base station, for example to share congestion information, and to arrange a handover to that other base station, for example for the purposes of load balancing.

The serving base station can then send a message to the device 30, instructing it to direct its antenna to that other base station so that the handover can be performed.

From the information that it has previously gathered on its surrounding cells in step 86, the device 30 will know the channel and beam direction of the new target cell, and will be able to set its frequency and beam direction to allow handover to the new cell. This will allow improved cell loading to be achieved.

When the device 30 has established a connection to the selected base station, it can then act as a relay in a conventional manner, as described in the relevant standards such as the 3GPP standards, to allow the first base station 12 to establish a connection to that selected base station. Thus, traffic from UE devices such as the devices 22, 24 can use the connection between the first base station 12 and the selected base station through the relay device 30 as a backhaul link. Similarly, the relay device 30 can act as a fronthaul link for data coming from the first base station or base stations.

The process shown in FIG. 5 can be performed periodically, in order to discover the status of a dynamic radio environment. This process is therefore particularly useful when the device 30 and the co-located first base station are provided on a mobile platform that may be moving through a region containing many base stations of a cellular network. For example, the process may be performed once per minute. In some embodiments, the device 30 is provided with a movement sensor, and performs the process shown in FIG. 5 during periods when movement of the device 30 has been detected.

In addition, the information gathered during this scan can be used to shape the basestation antenna beam. This is of particular relevance in a case in which there are multiple device such as the device 30, each deployed with a respective co-located base station such as the first base station 12 on a respective mobile platform such as a vehicle. When the multiple vehicles move into close proximity with each other, there is a danger that there could be interference between them. To avoid this, the co-located base stations can use information obtained by their respective devices 30 to set their own beam patterns.

Specifically, if there are multiple vehicles, each carrying a base station in order to provide service for UEs in their respective locations, and if those base stations move into close proximity with each other, the base stations can be configured to set their antenna beam patterns so that there is minimal overlap between their respective coverage areas.

Steps need to be taken in that case to prevent the base stations from entering a cycle, where each base station sets its antenna beam pattern in response to a change by another base station, and that then causes another change, and so on. For example, the base stations could be configured with random scan intervals, making it unlikely that any two base stations are trying to adjust their beam shape at the same time. As another example, cells could be configured so that only one of the nearby base stations can be setting its antenna beam pattern at any time.

This principle, of suppressing the transmissions from a base station in a Time Division Duplex (TDD) system, is more widely applicable. Thus, any control device with suitable control, such as a device or relay or base station, can initiate the interruption to the transmissions from any one or more base station, but in particular a base station that is co-located or otherwise associated with the device.

The control device is able automatically to detect transmissions from the one or more base station, in order to determine the transmit time intervals. The control then initiates suppression of the transmit signals from the one or more base station during at least one subsequent transmit interval. This suppression can be performed in the radio hardware of the one or more base station, or by an externally controlled attenuator between the power amplifier output and the transmit antenna, effectively without the base station knowing that its transmit signals have been suppressed.

The suppression interval is preferably short enough that it has no effect in the radio access network. During the suppression of the transmit signals from the one or more base station, the control device detects downlink signals transmitted by other nearby base stations in the network. For example, in the case of a device with a beam shaping antenna, this could be achieved by performing a 360 degree scan of the surrounding area. The results of this scan allow the control device, or another device to which the control device sends the results, to determine signal metrics such as signal strength and quality. In addition, it is possible to demodulate the received downlink signals and acquire further information contained for example in a LTE MIB.

This can be done off line, after the signal has been captured, reducing the required duration of the base station transmit signal suppression.

Thus, the device is able to perform a process of discovery to identify a suitable base station for establishing a connection so that it can act as a relay in a backhaul link.

The invention claimed is:

1. A method of operation of a device in a cellular communications network, such that the device acts as a relay in a backhaul link between a first base station and the network, the method comprising:
   detecting signals transmitted by base stations in the network;
   identifying the first base station amongst the base stations;
   causing a transmit signal from the first base station to be suppressed;
   selecting a second base station amongst the base stations based on properties of the detected signals; and
   establishing a connection with the second base station.

2. The method of claim 1, further comprising:
   identifying the first base station amongst the base stations based on the properties of the detected signals.

3. The method of claim 2, further comprising:
   identifying the first base station as being a base station amongst the base stations having a highest signal strength.

4. The method of claim 2, further comprising:
   identifying the at least one first base station as being a base station amongst the base stations having a shortest link delay for transmissions from the base station received by the device.

5. The method of claim 1, wherein selecting the second base station based on the properties of the detected signals comprises selecting a base station based on a detected signal strength, based on a measure of signal quality, or based on an available data rate.

6. The method of claim 1, wherein detecting the signals transmitted by the base stations in the network comprises adjusting an antenna beam direction or antenna beam shape.

7. The method of claim 6, further comprising:
   storing information identifying an antenna beam direction or antenna beam shape corresponding to the base stations in the network from which signals were detected.

8. The method of claim 1 wherein establishing the connection with the second base station comprises adjusting an antenna beam direction or antenna beam shape such that the antenna beam direction or antenna beam shape matches a direction of the second base station.

9. The method of claim 1, wherein establishing the connection with the second base station comprises adjusting an antenna beam direction or antenna beam shape such that the antenna beam direction or antenna beam shape matches a direction of the second base station, as determined while detecting the signals transmitted by the base stations in the network.

10. The method of claim 8, further comprising:
    having establishing the connection with the second base station, further adjusting the antenna beam direction or antenna beam shape in order to perform a handover to an alternative base station, if instructed to do so.

11. A method of operation of a device in a cellular communications network, such that the device acts as a relay in a backhaul link between a first base station and the network, the method comprising:
    causing the first base station to interrupt its transmissions;
    detecting signals transmitted by base stations in the network during the interruption of transmissions from the first base station;
    selecting one of the base stations based on properties of the detected signals; and
    establishing a connection with the selected base station.

12. The method of claim 11, further comprising:
    causing the first base station to interrupt its transmissions for a duration of one transmit interval; and
    detecting signals transmitted by the base stations in the network during said one transmit interval.

13. The method of claim 11, further comprising:
    causing the first base station to interrupt its transmissions for a duration of time that does not result in active calls being dropped; and
    detecting signals transmitted by the base stations in the network during said duration of time.

14. The method of claim 11, wherein the step of detecting signals transmitted by base stations in the network comprises adjusting an antenna beam direction or antenna beam shape.

15. The method of claim 14, further comprising:
    causing the first base station to interrupt its transmissions for a duration of time that does not result in active calls being dropped, but is long enough to allow the device to detect a strength of signals received from surrounding base stations and to adjust its antenna beam direction or antenna beam shape between detecting signals from different base stations.

16. The method of claim 11, wherein selecting one of the base stations based on the properties of the detected signals comprises selecting a base station based on the detected signal strength, based on a measure of signal quality, or based on an available data rate or based on cell identification.

17. A method of operation of a control device, the method comprising:
    detecting transmissions from one or more base station, and determining transmit time intervals thereof;
    initiating suppression of transmit signals from the one or more base station during at least one subsequent transmit interval; and
    detecting signals transmitted by at least one other base station during said subsequent transmit interval.

18. The method of claim 17, further comprising:
    performing the suppression in radio hardware of the one or more base station.

19. The method of claim 17, further comprising:
    performing the suppression by an externally controlled attenuator between a power amplifier output and a transmit antenna of the one or more base station.

20. The method of claim 17, further comprising:
    detecting signals transmitted by the at least one other base station during said subsequent transmit interval by adjusting a beam shaping antenna to scan a surrounding area.

21. The method of claim 17, comprising:
    determining signal metrics of the detected signals transmitted by the at least one other base station.

22. The method of claim 17, comprising:
demodulating the detected signals transmitted by the at least one other base station.

\* \* \* \* \*